(12) United States Patent
Hashida

(10) Patent No.: US 7,940,251 B2
(45) Date of Patent: May 10, 2011

(54) INPUT DEVICE

(75) Inventor: Junji Hashida, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 665 days.

(21) Appl. No.: 12/046,172

(22) Filed: Mar. 11, 2008

(65) Prior Publication Data

US 2008/0225015 A1     Sep. 18, 2008

(30) Foreign Application Priority Data

Mar. 13, 2007   (JP) ................................ 2007-062909

(51) Int. Cl.
    *G06F 3/041*      (2006.01)
(52) U.S. Cl. .................. 345/173; 178/18.06; 178/19.03; 438/694; 379/93.19
(58) Field of Classification Search ................... 345/173, 345/174; 178/18.01, 18.05, 18.06, 19.03, 178/19.04; 379/93.19; 438/694

See application file for complete search history.

(56) References Cited

U.S. PATENT DOCUMENTS

| | | | |
|---|---|---|---|
| 6,093,477 A | 7/2000 | Matsufusa et al. | |
| 6,686,546 B2 * | 2/2004 | Chiu | 178/18.01 |
| 7,218,314 B2 | 5/2007 | Itoh | |

* cited by examiner

*Primary Examiner* — Abbas Abdulselam
(74) *Attorney, Agent, or Firm* — Brinks Hofer Gilson & Lione

(57) ABSTRACT

A first planar input unit includes a transparent first substrate and a transparent second substrate that are stacked on each other. On an electrode formation surface of the first substrate, transparent Y-driving electrodes and transparent shielding layers are formed. On an electrode formation surface of the second substrate, X-driving electrodes and first detection electrodes are formed. At the rear of the first substrate, a display unit, such as a liquid crystal panel, is provided. Since the shielding layers are located between the display unit and the first detection electrodes, a change in the potential of the first detection electrodes is prevented from being adversely affected by noise emitted from the display unit.

5 Claims, 5 Drawing Sheets

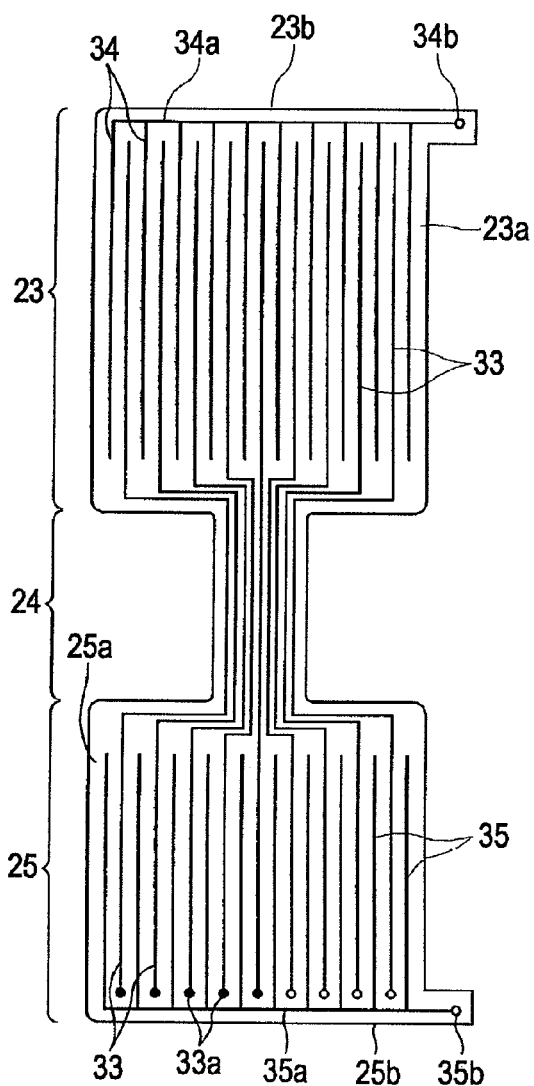
FIG. 3B
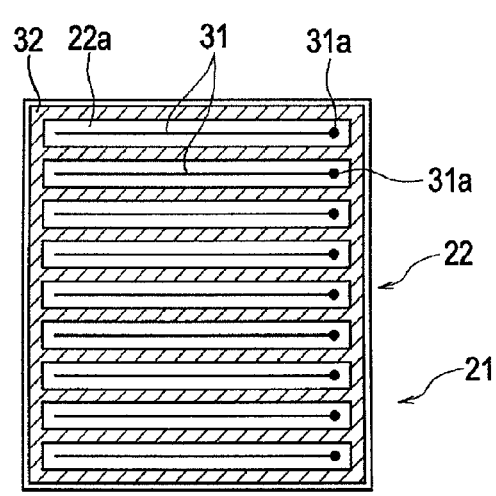
FIG. 3A
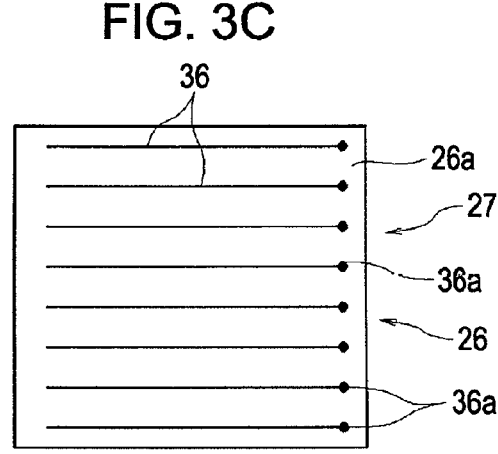
FIG. 3C
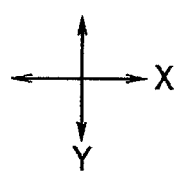

INPUT DEVICE

CLAIM OF PRIORITY

This application claims benefit of the Japanese Patent Application No. 2007-062909 filed on Mar. 13, 2007, which is hereby incorporated in its entirety by reference.

BACKGROUND OF THE INVENTION

1. Field of the Invention

The present invention relates to input devices capable of detecting, on the basis of a change in the electrostatic field between electrodes, a position to which an operating unit is placed in close proximity, and more particularly, to a low-profile input device having a shielding function.

2. Description of the Related Art

Examples of input devices for inputting coordinate data to be used for moving a cursor displayed on the screen of a personal computer or the like are planar input devices utilizing a change in electrostatic capacitance.

In a planar input device, a plurality of X electrodes and a plurality of Y electrodes are arranged in a matrix and the plurality of X electrodes and the plurality of Y electrodes face each other with an insulating layer therebetween. When one of the X electrodes is selected and a voltage is applied between the selected X electrode and each of the Y electrodes, the rising of the voltage depends on the electrostatic field between the selected X electrode and each of the Y electrodes. When a finger, which is a conductive material, is placed in close proximity to the selected X electrode, electrostatic capacitance is generated between the finger and the selected X electrode. Thus, rising of the voltage between the selected X electrode, to which the finger is placed in close proximity, and each of the facing Y electrodes varies in accordance with a change in the electrostatic field. When a change in the rising of the voltage is detected, the position of the planar input device at which an operation is performed can be identified.

In a case where transparent substrates and transparent electrodes are used in a planar input device of this type and such a planar input device is provided in front of a display unit, such as a liquid crystal display device, a user is able to touch the display screen, while looking at the contents displayed on the display unit, to input an operating signal.

However, since a display unit, such as a liquid crystal display device, is driven at a high frequency, radiation noise is likely to occur in the display unit. If a planar input device is disposed in the vicinity of such a display unit, the potential of an electrode of the planar input device is susceptible to variation due to the influence of radiation noise. Since planar input devices are used to detect fine variations in the intensity of the electrostatic field between electrodes, in a case where an electrode potential varies due to the influence of radiation noise, a malfunction is likely to occur in detection of the position touched by a finger.

Under such circumstances, in the case of disposing a display unit on a planar input device, it is necessary to form a shielding layer, which is formed of a transparent conductive film, between the planar input device and the display unit. However, in order to form a transparent shielding layer on one surface of a substrate and form a transparent electrode on the other surface of the substrate, it is necessary to process a substrate having transparent conductive layers, such as indium tin oxide (ITO) films, on both surfaces thereof. Thus, a manufacturing process is problematic. Furthermore, a very high cost is required for the manufacturing. Thus, in order to manufacture a planar input device of this type, at least three substrates, that is, a transparent substrate including a shielding layer, a transparent substrate including X electrodes, and a transparent substrate including Y electrodes, must be stacked on each other. As a result, the total thickness of the substrates becomes large, and it is difficult to use such a thick planar input device for a low-profile apparatus.

Examples of the related art include Japanese Unexamined Patent Application Publication Nos. 11-85371 and 2002-366304.

SUMMARY

According to an aspect, an input device including a first substrate; a plurality of first driving electrodes formed on a surface of the first substrate; an insulating layer; and a plurality of second driving electrodes formed above the plurality of first driving electrodes with the insulating layer therebetween. The plurality of second driving electrodes that intersect the plurality of first driving electrodes and are insulated from the plurality of first driving electrodes includes shielding layers provided on the surface of the first substrate where the plurality of first driving electrodes are formed. The shielding layers are located between adjacent first driving electrodes of the plurality of first driving electrodes. The detection electrodes are provided on a surface where the plurality of second driving electrodes is formed. The detecting electrodes are located between adjacent second driving electrodes of the plurality of second driving electrodes. Driving signals are sequentially applied to the plurality of first driving electrodes and the plurality of second driving electrodes, and detection signals based on changes in electrostatic fields generated between electrodes are obtained from the detection electrodes.

In the input device, by checking the delay state of rising of the potential of a detection electrode in a case where one of the first driving electrodes is selected and a potential is applied to the selected one of the first driving electrodes and where one of the second driving electrodes is selected and a potential is applied to the selected one of the second driving electrodes, a change in the electrostatic field between electrodes is detected. Thus, the position to which a finger, which is a conductive operating unit, is in close proximity can be detected in accordance with the detection result.

Since the shielding layers are provided between the surface where the detection electrodes are provided and the display unit, noise emitted from the display unit can be blocked by the shielding layers. In addition, in a case where a potential is applied to a selected driving electrode, the rising of the potential of the detection electrode is less likely to be affected by the excessive influence of noise. Thus, an error in detecting the position touched by a finger or the like is less likely to occur.

In addition, a predetermined potential is applied to a selected one of the plurality of first driving electrodes, which are formed on the surface where the shielding layers are formed on the display unit, and unselected electrodes are set to have a ground potential. Thus, detection of the position of a finger or the like can be obtained in accordance with a change in the potential of detection electrodes, which are located above the shielding layers and the first driving electrodes and are closer to the front side. Thus, even if the first driving electrodes are located on the display unit, noise does not affect a change in the potential of a detection electrode. Consequently, an adverse effect is less likely to be exerted on detection of the position of a finger or the like.

Thus, it is unnecessary to form shielding layers on another surface below the first driving electrodes. Thus, a low-profile planar input unit utilizing a change in electrostatic capacitance can be achieved.

In addition, the first substrate and the insulating layer may be transparent, the plurality of first driving electrodes, the shielding layers, the plurality of second driving electrodes, and the detection electrodes may be transparent, a display unit may be provided at the rear of the first substrate, and a display surface of the display unit may face the first substrate.

Thus, a low-profile transparent planar input unit of an electrostatic capacitance type can be disposed in front of the display unit, such as a liquid crystal panel.

The term "transparent" used in this specification does not necessarily mean 100 percent transmission of light. A light transmission property in which the contents displayed on the display surface of the display unit, such as a liquid crystal panel, can be viewed through the substrates, the insulating layers, the electrodes, and the shielding layers, is sufficient.

An input device according to an aspect of the present invention is less likely to be affected by noise emitted from circuits and electronic units located at the rear of the input device and can be configured to be low-profile. In addition, the contents displayed on the display unit disposed at the rear of the input device can be viewed and the input device can be configured to be low-profile.

BRIEF DESCRIPTION OF THE DRAWINGS

FIG. 3A is a plan view of a first substrate;

FIG. 3B is a plan view of second and fourth substrates;

FIG. 3C is a plan view of a third substrate;

DESCRIPTION OF THE EMBODIMENTS

Figure 1:
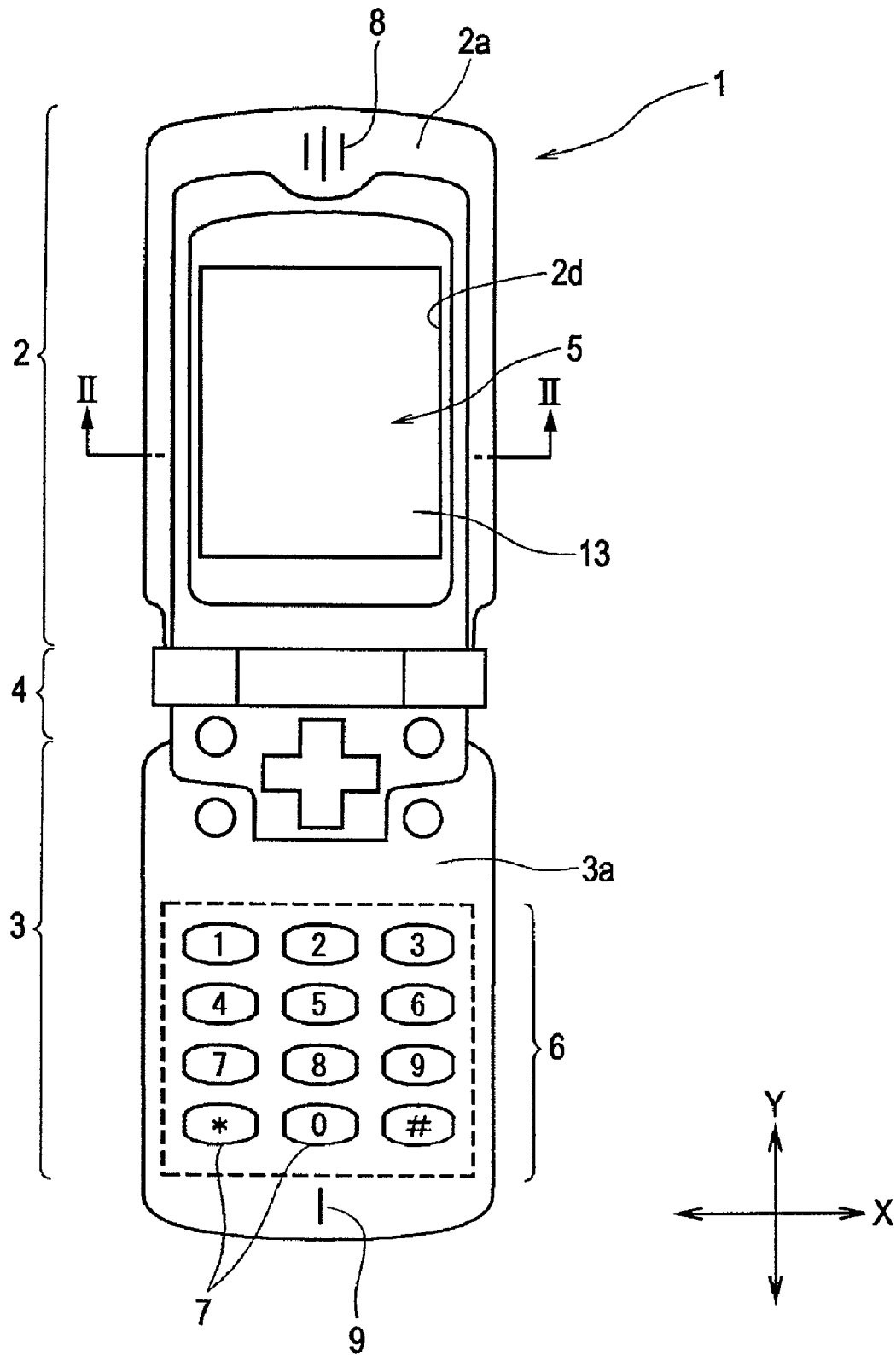
FIG. 1 is a front view showing a portable apparatus in which an input device according to an embodiment is provided.
Figure 2:
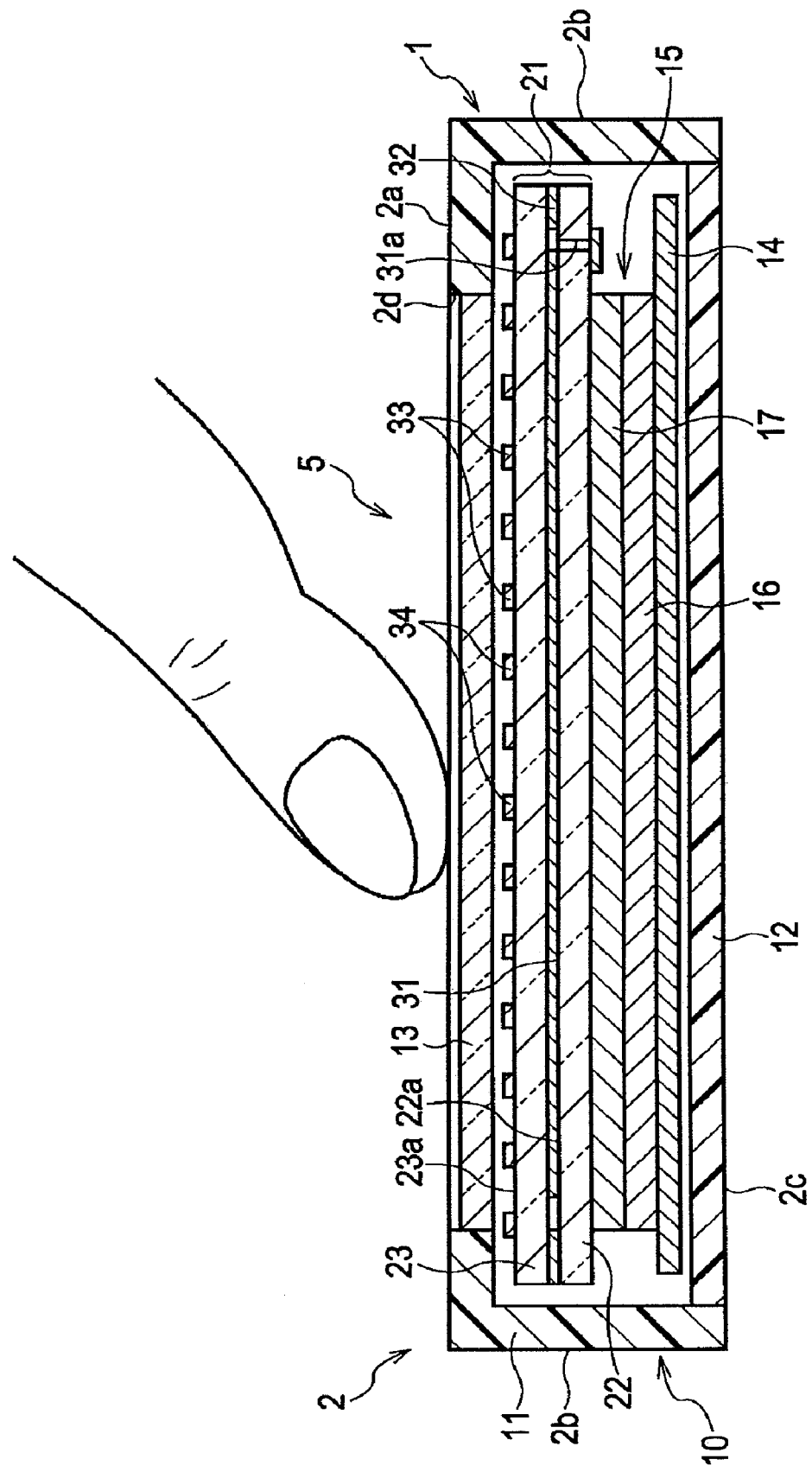
FIG. 2 is a sectional view of the portable apparatus taken along the line II-II of FIG. 1.
Figure 4:
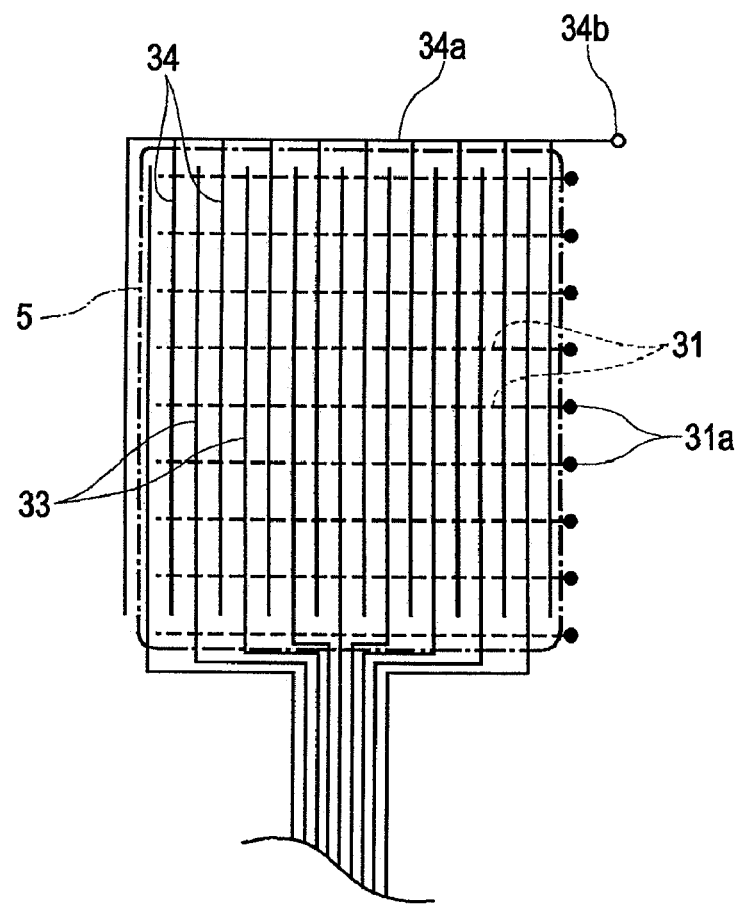
FIG. 4 is an explanatory view illustrating the positional relationship between a display region and an operation region of a first planar input unit.
Figure 5:
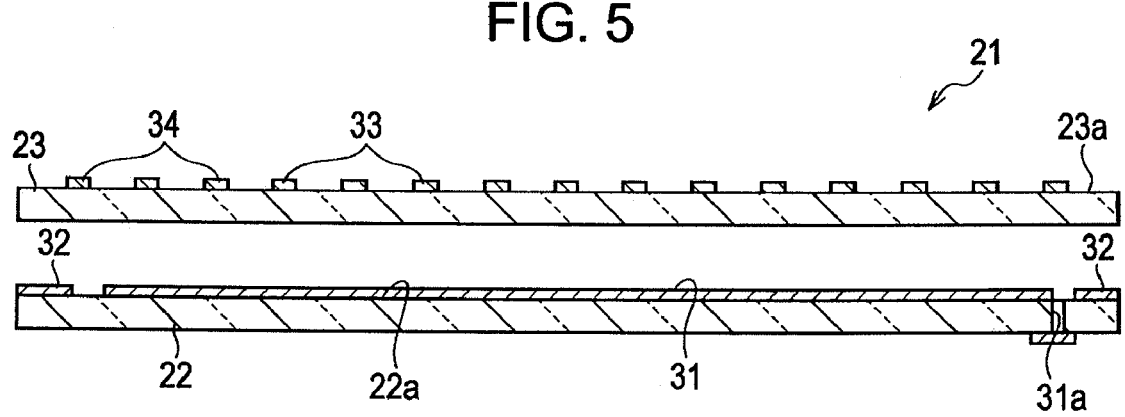
FIG. 5 is an explanatory view illustrating the first planar input unit where the first substrate and the second substrate are stacked on each other.
Figure 6:
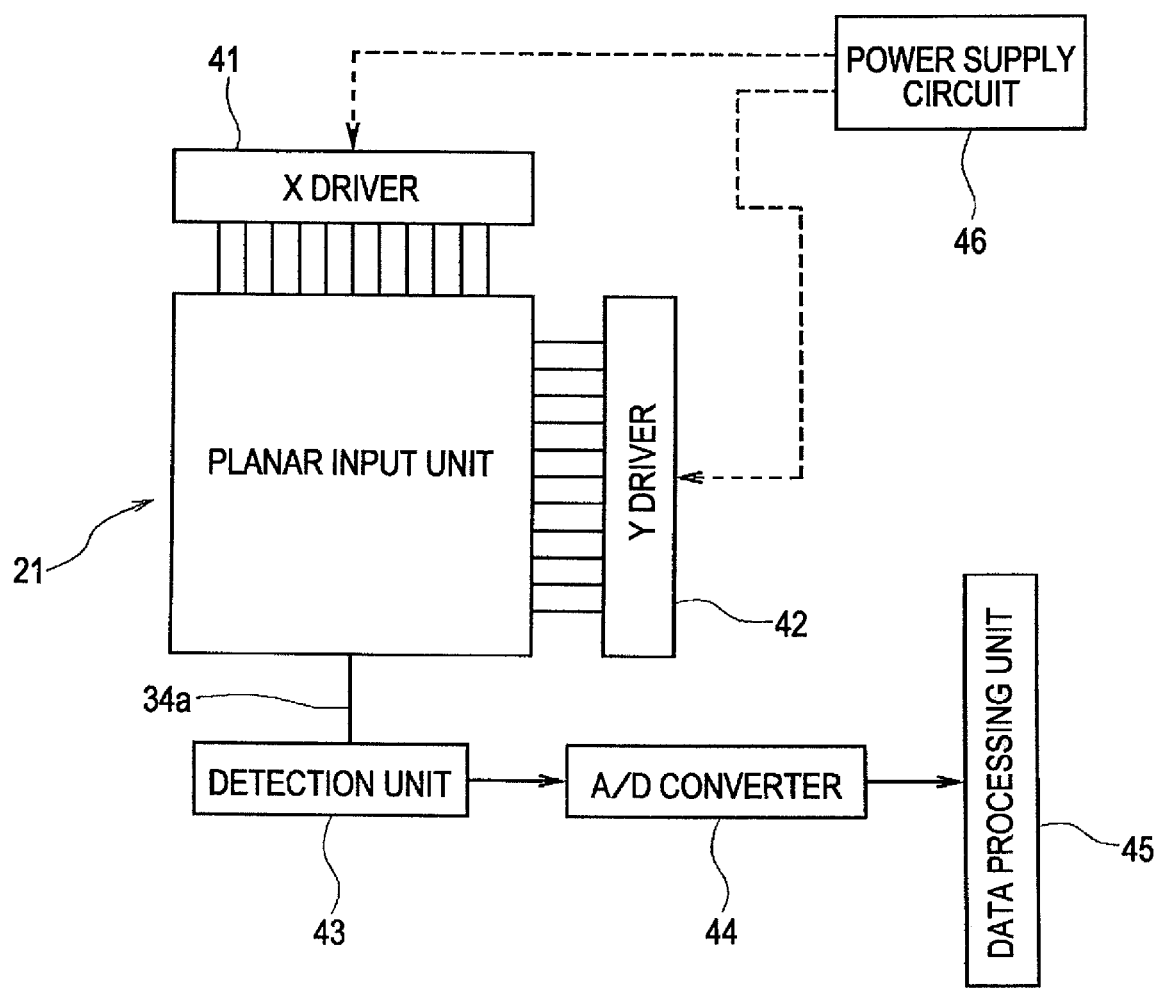
FIG. 6 is a circuit block diagram of an input unit.

FIG. 1 is a front view of a portable apparatus including an input device according to an embodiment. FIG. 2 is a sectional view of the portable apparatus taken along the line II-II of FIG. 1. FIGS. 3A, 3B, and 3C are plan views each showing a substrate forming an input device to be provided in the portable apparatus. FIG. 4 is a partial front view showing the relationship between an input region of a planar input unit and a display region of a display unit. FIG. 5 is a side explanatory view illustrating a state where two substrates are stacked on each other. FIG. 6 is a circuit block diagram showing an input device.

Referring to FIG. 1, a portable apparatus 1 has a telephone function, a data transmission/reception function, a game function, and a function of processing various data. The portable apparatus 1 includes a display main unit 2, an operation main unit 3, and a hinge unit 4 for coupling the display main unit 2 and the operation main unit 3 together. In FIG. 1, a front surface 2a of the display main unit 2 and a front surface 3a of the operation main unit 3 are directed toward the front side of the drawing sheet of FIG. 1. The portable apparatus 1 can be folded like a clamshell around the hinge unit 4 such that the front surface 2a of the display main unit 2 and the front surface 3a of the operation main unit 3 face each other.

A square region of the front surface 2a of the display main unit 2 serves as a display region 5. When a finger, which is a conductive operating unit, is in contact with the display region 5 or the finger that is in contact with the display region 5 is moved, the position touched by the finger can be detected and an input operation based on the contact of the finger can be achieved. A main operation region 6 is provided on the front surface 3a of the operation main unit 3. A plurality of key input units 7 are arranged in the main operation region 6. When one of the key input units 7 is pressed with a finger, a switch signal assigned for the pressed key input unit 7 can be input. In addition, when a finger is in contact with the main operation region 6 or a finger that is in contact with the main operation region 6 is moved, the position touched by the finger can be detected and writing of a character or a symbol can be achieved.

A receiver 8, which is to be used for the telephone function, is contained in a leading end portion of the front surface 2a of the display main unit 2. A microphone 9 is contained in a trailing end portion of the front surface 3a of the operation main unit 3.

As shown in FIG. 2, the display main unit 2 includes a hollow case 10. The case 10 is made of a synthetic resin material. The case 10 includes an upper case portion 11 and a lower case portion 12 that are bonded together. The upper case portion 11 covers the front surface 2a and side surfaces 2b, and the lower case portion 12 covers a rear surface 2c.

In the display region 5 on the front surface 2a of the display main unit 2, a rectangular opening 2d is formed in the upper case portion 11, and a transparent cover plate 13 is provided over the opening 2d. The cover plate 13 is, for example, a transparent synthetic resin plate or a transparent glass plate.

As shown in FIG. 2, inside the display main unit 2, a supporting substrate 14 is fixed near the rear surface 2c, and a display unit 15 is provided near the front side of the supporting substrate 14. The display unit 15 is a color liquid crystal display panel. A liquid crystal material is filled in a space between substrates 16 and 17, which are made of glass or resin films. Transparent electrodes are disposed on surfaces of the substrates 16 and 17 that face each other, and color filters to be used for color display are disposed on the substrate 16.

A first planar input unit 21 is disposed between the display unit 15 and the cover plate 13. As shown in FIG. 2, when a finger, which is a conductive operating unit, is in contact with a front face of the cover plate 13, the first planar input unit 21 is capable of detecting a change in the electrostatic field between electrodes and detecting the position touched by the finger. Since the entire first planar input unit 21 is transparent, a user is able to view the contents displayed on the display unit 15, which is located at the rear side of the first planar input unit 21, through the first planar input unit 21 and the cover plate 13, as shown in FIG. 1.

The first planar input unit 21 includes a first substrate 22, which is located near the display unit 15, and a second substrate 23, which is stacked on the first substrate 22 and directed toward the cover plate 13. The first substrate 22, which is shown in FIG. 3A, is of a size to be accommodated within the display main unit 2. The second substrate 23, which is shown in FIG. 3B, has an area substantially the same as the first substrate 22. A coupling unit 24 and a fourth substrate 25 are formed integrally with the second substrate 23. The fourth substrate 25 is of a size to be accommodated within the operation main unit 3. The coupling unit 24 passes through the inside of the hinge unit 4.

In the operation main unit 3, a third substrate 26, which is shown in FIG. 3C, is disposed at the rear side of the fourth substrate 25. Inside the operation main unit 3, the third substrate 26 and the fourth substrate 25 are stacked on each other to form a second planar input unit 27.

As shown in FIG. 3B, the second substrate 23, the coupling unit 24, and the fourth substrate 25 are made of transparent synthetic resin sheets, such as polyethylene terephthalate (PET) sheets, and are formed integrally with each other. The first substrate 22, which is shown in FIG. 3A, is also made of a transparent resin sheet, such as a PET sheet. Since a display unit is not provided at the rear of the third substrate 26, which is shown in FIG. 3C, the third substrate 26 may be transparent or opaque.

As shown in FIG. 3A, a surface of the first substrate 22 that is directed toward the cover plate 13 serves as an electrode formation surface 22a. On the electrode formation surface 22a, Y-driving electrodes 31, which are first driving electrodes, and shielding layers 32 are formed. The Y-driving electrodes 31 and the shielding layers 32 are formed of transparent conductive films. The first substrate 22 is produced as described below. Using a substrate, which is a transparent resin sheet, such as a PET sheet, having the electrode formation surface 22a thereon, the entire of which is covered with a transparent conductive film made of indium-tin-oxide (ITO), zinc oxide (ZnO), or the like, etching of the electrode formation surface 22a is performed and patterning of the transparent conductive film is performed. Accordingly, the Y-driving electrodes 31 and the shielding layer 32s are formed.

The Y-driving electrodes 31 are arranged in parallel with predetermined intervals therebetween in a Y direction, which is a longitudinal direction of the portable apparatus 1, and extend linearly in the X direction. The right end of each of the Y-driving electrodes 31 serves as an outgoing terminal. As shown in FIGS. 2 and 5, through-holes 31a are formed at the positions of the outgoing terminals of the first substrate 22. The Y-driving electrodes 31 are externally lead by conductive materials, such as silver pastes, filled in the through-holes 31a.

The shielding layers 32 are formed at least between adjacent Y-driving electrodes 31. In addition, in at least one of the right and left sides in the FIG. 3A, all the shielding layers 32 are coupled together through ends of the Y-driving electrodes 31. In addition, the shielding layers 32 are set to a ground potential through a lead portion, which is not shown.

As shown in FIG. 3B, a surface of the second substrate 23 that is directed toward the cover plate 13 serves as an electrode formation surface 23a. A plurality of X-driving electrodes 33, which are second driving electrodes, and a plurality of first detection electrodes 34 are formed on the electrode formation surface 23a. The X-driving electrodes 33 and the first detection electrodes 34 are formed of transparent conductive films, similarly to the Y-driving electrodes 31 and the shielding layers 32. That is, the X-driving electrodes 33 and the first detection electrodes 34 are formed by etching a transparent conductive film, which is made of ITO, ZnO, or the like, formed on all over one surface of a substrate, which is made of PET or the like. The X-driving electrodes 33 are arranged in parallel with predetermined intervals therebetween in the X direction and extend linearly in the Y direction.

The X-driving electrodes 33 extend to a surface of the fourth substrate 25 through the coupling unit 24. The X-driving electrodes 33 are arranged in parallel with predetermined intervals therebetween in the X direction and extend linearly in the Y direction on an electrode formation surface 25a of the fourth substrate 25. In portions that are further inward than a trailing edge 25b of the fourth substrate 25, external connection portions 33a are formed at ends of the X-driving electrodes 33.

The first detection electrodes 34 are formed only on the electrode formation surface 23a of the second substrate 23. The first detection electrodes 34 are disposed between adjacent X-driving electrodes 33. The first detection electrodes 34 are arranged in parallel with the X-driving electrodes 33 with predetermined intervals therebetween. As shown in FIG. 3B, a lead layer 34a extending linearly in the X direction is formed in a position that is further inward than a leading edge 23b of the second substrate 23. All the first detection electrodes 34 are formed integrally with each other so as to be connected to the lead layer 34a. An external connection end 34b is formed at an end of the lead layer 34a. The lead layer 34a is also made of a transparent conductive layer, similarly to the X-driving electrodes 33 and the first detection electrodes 34.

Second detection electrodes 35 are formed on the electrode formation surface 25a of the fourth substrate 25, which is formed integrally with the second substrate 23. The second detection electrodes 35 are independent of the first detection electrodes 34 and are provided only on the electrode formation surface 25a of the fourth substrate 25. The second detection electrodes 35 are disposed between adjacent X-driving electrodes 33. The second detection electrodes 35 are arranged in parallel with the X-driving electrodes 33 with predetermined intervals therebetween. A lead layer 35a extending in the X direction is formed in a position that is further inward than the trailing edge 25b of the fourth substrate 25. An external connection end 35b is formed at an end of the lead layer 35a. All the second detection electrodes 35 are formed integrally with each other so as to be connected to the lead layer 35a.

A surface of the third substrate 26, which is shown in FIG. 3C, that is directed toward the fourth substrate 25 serves as an electrode formation surface 26a. A plurality of Y-driving electrodes 36 are provided on the electrode formation surface 26a. The Y-driving electrodes 36 are not necessarily transparent. The Y-driving electrodes 36 are formed of low-resistance materials, such as copper, silver, or gold. External connection portions 36a are formed at right ends of the Y-driving electrodes 36.

As shown in FIG. 5, in the first planar input unit 21, the first substrate 22 is disposed below the second substrate 23. In addition, as shown in FIG. 2, inside the display main unit 2, the first planar input unit 21 is disposed near the display surface of the display unit 15. Thus, the Y-driving electrodes 31 and the X-driving electrodes 33 are orthogonal to each other and face each other with the second substrate 23 therebetween. The Y-driving electrodes 31 and the first detection electrodes 34 are also orthogonal to each other and face each other with the second substrate 23 therebetween.

Since the shielding layers 32 are formed on the surface of the first substrate 22, which is located below the second substrate 23, the shielding layers 32 are located between the first detection electrodes 34 and the display unit 15. In addition, the shielding layers 32 and the first detection electrodes 34 face each other with the second substrate 23 therebetween.

As shown in FIG. 4, the size of the display region 5, over which the cover plate 13 is provided, is slightly smaller than the size of a detection region of the first planar input unit 21. Thus, the first planar input unit 21 is capable of detecting information on any position of the cover plate 13 touched by a finger.

Inside the operation main unit 3, the third substrate 26 is disposed at the rear of the fourth substrate 25 to form the second planar input unit 27. In the operation main unit 3, the second planar input unit 27 is disposed in a position that is further inward than the front surface 3a. Immediately below the key input units 7, dome-shaped invertible contacts are disposed below the second planar input unit 27. On the front surface 3a of the operation main unit 3, the key input units 7 are arranged such that the key input units 7 can be pressed individually. When one of the key input units 7 is pressed, the third substrate 26 and the fourth substrate 25 are deformed. Thus, a corresponding dome-shaped contact is inverted to be in contact with a fixed contact disposed below the dome-shaped contact, and a corresponding switch mechanism is turned on.

As shown in the circuit block diagram of FIG. 6, in the first planar input unit 21, which is provided inside the display main unit 2, the X-driving electrodes 33 are connected to an X driver 41 and the Y-driving electrodes 31 are connected to a Y driver 42. In addition, the lead layer 34a, which is electrically connected to all the first detection electrodes 34, is connected to a detection unit 43. The detection unit 43 detects changes in the potentials of the first detection electrodes 34. An analog-to-digital (A/D) converter 44 converts the detected changes into digital values. The digital values are supplied to a data processing unit 45, which corresponds to a controller. A power supply circuit 46 supplies power to the X driver 41 and the Y driver 42.

Circuits equivalent to the circuits shown in FIG. 6 are connected to the second planar input unit 27, which is provided inside the operation main unit 3. As shown in FIG. 3B, since the X-driving electrodes 33 continuously extend from the first planar input unit 21 to the second planar input unit 27, the X driver 41 is shared between the first planar input unit 21 and the second planar input unit 27. In contrast, different Y drivers 42 are connected to the Y-driving electrodes 31, which are provided in the first planar input unit 21, and to the Y-driving electrodes 36, which are provided in the second planar input unit 27.

Operations of the portable apparatus 1 and the planar input units will now be described.

Referring to FIG. 6, the X driver 41 sequentially selects the X-driving electrodes 33, and a predetermined potential is applied to a selected one of the X-driving electrodes 33. In the first planar input unit 21, the Y driver 42 sequentially selects the Y-driving electrodes 31, and a predetermined potential is applied to a selected one of the Y-driving electrodes 31. The X-driving electrode 33 and the Y-driving electrode 31 are selected at different times, and potentials are not applied to the X-driving electrode 33 and the Y-driving electrode 31 at the same time. The data processing unit 45 controls a time at which each of the X-driving electrodes 33 is selected by the X driver 41 and a time at which each of the Y-driving electrodes 31 is selected by the Y driver 42.

When one of the X-driving electrodes 33 is selected and a potential is applied to the selected one of the X-driving electrodes 33, all the unselected X-driving electrodes 33 are set to have a ground potential, and the Y-driving electrodes 31 are also set to have the ground potential. When the potential, which is a pulse-like potential, is applied to the selected one of the X-driving electrodes 33, the potential of the first detection electrodes 34 increases on the basis of a predetermined time constant in accordance with the electrostatic capacitance between the selected one of the X-driving electrodes 33 and adjacent first detection electrodes 34 and the electrostatic capacitance between the first detection electrodes 34 and the grounded Y-driving electrodes 31. In this case, if a finger, which is a conductive material, is placed in close proximity to the X-driving electrode 33 to which the potential is applied, the electrostatic capacitance is also generated between the finger and the X-driving electrode 33 and between the finger and the first detection electrodes 34. Thus, the speed at which the potential of the first detection electrodes 34 rises changes.

The detection unit 43 detects the rising of the potential of the first detection electrodes 34 through the lead layer 34a. The A/D converter 44 converts a change in the rising time of the potential into a digital value, and the digital value is supplied to the data processing unit 45. The data processing unit 45 specifies the X-coordinate position touched by the finger in accordance with information indicating the X-driving electrode 33 being selected and a signal obtained from the detection unit 43.

In addition, when one of the Y-driving electrodes 31 is selected and a pulse-like potential is applied to the selected one of the Y-driving electrodes 31, all the unselected Y-driving electrodes 31 are set to have a ground potential, and the X-driving electrodes 33 are also set to have the ground potential. At this time, if a finger is placed in close proximity to the selected one of the Y-driving electrodes 31, the rising of the potential of the first detection electrodes 34 changes. The detection unit 43 detects the change. The data processing unit 45 specifies the Y-coordinate position touched by the finger in accordance with information indicating the Y-driving electrode 31 being selected and a signal obtained from the detection unit 43.

In the display region 5 of the display main unit 2, the contents displayed on the display unit 15 can be viewed through the first planar input unit 21. In a case where an operator touches a position of the display region 5 while viewing the contents displayed in the display region 5, the operator is able to know, using the first planar input unit 21, the X- and Y- coordinate positions touched by the finger. In accordance with the position touched by the finger, an input operation based on the contents displayed in the display region 5 can be performed.

As shown in FIG. 2, the shielding layers 32 exhibiting the ground potential are provided between the first detection electrodes 34 and the display unit 15. In addition, in a case where one of the X-driving electrodes 33 is selected and a potential is applied to the selected one of the X-driving electrodes 33, the Y-driving electrodes 31, which are provided on the same surface where the shielding layers 32 are provided, also exhibit the ground potential. Thus, in a case where one of the X-driving electrodes 33 is selected, radiation noise emitted from the display unit 15 can be easily blocked by the shielding layers 32 exhibiting the ground potential and the Y-driving electrodes 31 exhibiting the ground potential. Thus, radiation noise is less likely to affect a change in the potential of the first detection electrodes 34, which are disposed above the shielding layers 32 and the Y-driving electrodes 31.

In addition, in a case where one of the Y-driving electrodes 31 is selected and a potential is applied to the selected one of the Y-driving electrodes 31, all the unselected Y-driving electrodes 31 are set to have a ground potential and the shielding layers 32 are also set to have the ground potential. At this time, radiation noise emitted from the display unit 15 can be easily blocked by the shielding layers 32 exhibiting the ground potential and the Y-driving electrodes 31 exhibiting the ground potential. Thus, radiation noise is less likely to affect a change in the potential of the first detection electrodes 34 in a case where the Y-driving electrode 31 is selected.

As described above, since the shielding layers 32 and the Y-driving electrodes 31 are provided between the first detection electrodes 34 and the display unit 15, the first planar input unit 21 is less likely to be affected by noise emitted from the display unit 15. In addition, since the Y-driving electrodes 31 and the shielding layers 32 are provided on the electrode formation surface 22a of the first substrate 22, the X-driving electrodes 33 and the first detection electrodes 34 are provided on the second substrate 23, and the first planar input unit 21 is formed by such two substrates, a low-profile configuration can be achieved. Moreover, since the first substrate 22 and the second substrate 23 can be produced from sheet materials having one surface covered with transparent conductive films, production cost can be reduced.

In addition, in the operation main unit 3, when one of the key input units 7 is pressed, a dome-shaped electrode disposed at the rear of the second planar input unit 27 is inverted and a corresponding switch can be turned on. Furthermore, in a case where a finger placed on the front surface 3a of the operation main unit 3 is moved, the second planar input unit 27 is capable of detecting the motion trajectory of the finger. By inputting the motion trajectory, a letter can be drawn and the drawn letter can be displayed in the display region 5.

In the first planar input unit 21, the orientation of the second substrate 23 may be vertically inverted from the state shown FIGS. 2 and 5, and a thin transparent resin layer may be applied between the electrode formation surface 22a of the first substrate 22 and the electrode formation surface 23a of the second substrate 23. In this case, since electrodes and shielding layers are formed on only two surfaces, a low-profile planar input unit can be achieved.

Although an input device according to each of the above-described embodiments is used in a mobile phone in the above description, the input device may be provided in a different type of portable apparatus. Alternatively, the input device may be provided in a television receiver, a remote controller for remote-controlling a personal computer, or the like.

What is claimed is:

1. An input device including a first substrate; a plurality of first driving electrodes formed on a surface of the first substrate; an insulating layer; and a plurality of second driving electrodes formed above the plurality of first driving electrodes with the insulating layer therebetween, the plurality of second driving electrodes intersecting the plurality of first driving electrodes and being insulated from the plurality of first driving electrodes, the input device comprising:

shielding layers provided on the surface of the first substrate where the plurality of first driving electrodes are formed, the shielding layers being located between adjacent first driving electrodes of the plurality of first driving electrodes; and detection electrodes provided on a surface where the plurality of second driving electrodes are formed, the detecting electrodes being located between adjacent second driving electrodes of the plurality of second driving electrodes, wherein driving signals are sequentially applied to the plurality of first driving electrodes and the plurality of second driving electrodes, and detection signals based on changes in electrostatic fields generated between electrodes are obtained from the detection electrodes.

2. The input device according to claim 1, wherein the first substrate and the insulating layer are transparent, the plurality of first driving electrodes, the shielding layers, the plurality of second driving electrodes, and the detection electrodes are transparent, a display unit is provided at the rear of the first substrate, and a display surface of the display unit faces the first substrate.

3. The input device according to claim 2, wherein the insulating layer is a transparent second substrate.

4. The input device according to claim 3, wherein the plurality of first driving electrodes and the shielding layers are formed by etching a single transparent conductive layer formed on the surface of the first substrate.

5. The input device according to claim 2, wherein the plurality of first driving electrodes and the shielding layers are formed by etching a single transparent conductive layer formed on the surface of the first substrate.

* * * * *